(12) United States Patent
Bansal et al.

(10) Patent No.: US 9,086,865 B2
(45) Date of Patent: Jul. 21, 2015

(54) POWER NAPPING TECHNIQUE FOR ACCELERATED NEGATIVE BIAS TEMPERATURE INSTABILITY (NBTI) AND/OR POSITIVE BIAS TEMPERATURE INSTABILITY (PBTI) RECOVERY

(75) Inventors: Aditya Bansal, White Plains, NY (US); Jae-Joon Kim, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 273 days.

(21) Appl. No.: 13/544,975

(22) Filed: Jul. 9, 2012

(65) Prior Publication Data

US 2014/0013131 A1    Jan. 9, 2014

(51) Int. Cl.
*G06F 1/26* (2006.01)

(52) U.S. Cl.
CPC .......................................... *G06F 1/26* (2013.01)

(58) Field of Classification Search
CPC ....... G06F 1/3203; G06F 1/3296; G06F 1/26; G01R 31/2642; G01R 31/2856; G01R 31/2858
USPC .......................................................... 713/320
See application file for complete search history.

(56) References Cited

U.S. PATENT DOCUMENTS

| | | | |
|---|---|---|---|
| 7,486,107 B1 * | 2/2009 | Bose et al. ........................ | 326/33 |
| 7,642,864 B2 | 1/2010 | Chuang et al. | |
| 7,710,141 B2 | 5/2010 | La Rosa et al. | |
| 7,916,531 B2 | 3/2011 | Abadeer et al. | |
| 7,949,482 B2 | 5/2011 | Gebara et al. | |
| 2006/0282804 A1 * | 12/2006 | Ang et al. ........................ | 716/4 |
| 2007/0018678 A1 * | 1/2007 | Puchner et al. ............... | 324/769 |
| 2008/0116455 A1 * | 5/2008 | Jain et al. ......................... | 257/48 |
| 2010/0046276 A1 | 2/2010 | Chen et al. | |
| 2010/0102872 A1 | 4/2010 | Wu et al. | |
| 2010/0321079 A1 | 12/2010 | Ishii et al. | |
| 2012/0119825 A1 * | 5/2012 | Zhai et al. ..................... | 327/543 |
| 2013/0015876 A1 * | 1/2013 | Lai et al. .................. | 324/762.01 |
| 2013/0047166 A1 * | 2/2013 | Penzes et al. ................. | 718/105 |

OTHER PUBLICATIONS

Shiyang Zhu, et al. "Mechanism of Dynamic Bias Temperature Instability . . . The Effect of Pulse Waveform". Electron Devices, IEEE Transactions on vol. 53, Issue, 8, 2006.
"A Voltage Bias Generator that Compensates PMOS NBTI, Supports Multiple Bulk Voltages, and Tracks PVT Conditions" Disclosed Anonymously; Oct. 24, 2006.
"Compensating Circuit for NBTI-Free PFET" IBM; Oct. 26, 2009.

* cited by examiner

*Primary Examiner* — Thomas Lee
*Assistant Examiner* — Danny Chan
(74) *Attorney, Agent, or Firm* — Preston J. Young; Otterstedt, Ellenbogen & Kammer, LLP

(57) ABSTRACT

A logic circuit is operated in a normal mode, with a supply voltage coupled to a supply rail of the logic circuit, and with a ground rail of the logic circuit grounded; It is determined that at least a portion of the logic circuit has experienced degradation due to bias temperature instability. Responsive to the determining, the logic circuit is operated in a power napping mode, with the supply voltage coupled to the ground rail of the circuit, with the supply rail of the circuit grounded, and with primary inputs of the circuit toggled between logical zero and logical one at low frequency. A logic circuit and corresponding design structures are also provided.

21 Claims, 12 Drawing Sheets

*SIMILAR RESULTS FOR NBTI

POWER NAPPING TECHNIQUE FOR ACCELERATED NEGATIVE BIAS TEMPERATURE INSTABILITY (NBTI) AND/OR POSITIVE BIAS TEMPERATURE INSTABILITY (PBTI) RECOVERY

FIELD OF THE INVENTION

The present invention relates to the electrical and electronic arts, and, more particularly, to techniques for recovering from negative bias temperature instability (NBTI) and/or positive bias temperature instability (PBTI) and the like.

BACKGROUND OF THE INVENTION

Threshold voltage (Vt) increase in metal oxide semiconductor field effect transistors (MOSFETs) due to Bias Temperature Instability (BTI) is a significant reliability concern in high-K (high dielectric constant) metal gate complementary metal oxide semiconductor (CMOS) technologies. P-type metal oxide semiconductor devices (PMOS) are affected by Negative BTI (NBTI) and n-type metal oxide semiconductor devices (NMOS) are affected by Positive BTI (PBTI). NBTI leads to PMOS Vt degradation and PBTI leads to NMOS Vt degradation.

NBTI and PBTI increase the magnitude of the threshold-voltage of PMOS and NMOS transistors with use. Increase in threshold voltage results in reduced current, thereby causing performance degradation and reduced robustness/reliability. Several methods to characterize and sense the threshold voltage shifts exist. Circuit techniques such as power gating, dynamic voltage scaling, workload migration, and the like are used to target power and temperature challenges, and are expected to be beneficial for NBTI/PBTI as well.

SUMMARY OF THE INVENTION

Principles of the invention provide a power napping technique for accelerated negative bias temperature instability (NBTI) and/or positive bias temperature instability (PBTI) recovery. In one aspect, an exemplary method includes operating a logic circuit in a normal mode, with a supply voltage coupled to a supply rail of the logic circuit, and with a ground rail of the logic circuit grounded; determining that at least a portion of the logic circuit has experienced degradation due to bias temperature instability; and, responsive to the determining, operating the logic circuit in a power napping mode, with the supply voltage coupled to the ground rail of the circuit, with the supply rail of the circuit grounded, and with primary inputs of the circuit toggled between logical zero and logical one at low frequency.

In another aspect, an exemplary logic circuit for operation with a supply voltage, a ground, and a plurality of primary inputs includes a circuit portion; a supply rail of the circuit portion; a ground rail of the circuit portion; and a switching arrangement. The switching arrangement is configured to interconnect the supply voltage with the supply rail of the logic circuit in a normal mode; interconnect the ground with the ground rail in the normal mode; interconnect the supply voltage with the ground rail of the logic circuit in a power napping mode; and interconnect the ground with the supply rail in the power napping mode.

In still another aspect, design structures directed to circuits of the kind described and/or portions thereof are provided.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the present invention may be realized in the form of an integrated circuit.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

As noted above, Negative and Positive Bias Temperature Instabilities (NBTI/PBTI) increase the magnitude of the threshold-voltage of PMOS and NMOS transistors with use. Increase in threshold voltage results in reduced current, thereby causing performance degradation and reduced robustness. Several methods to characterize and sense the threshold voltage shifts exist. Circuit techniques such as power gating (used to reduce power dissipation), dynamic voltage scaling (used to reduce power and temperature), workload migration (used to reduce the temperature of a core), and the like, which are used to target power and temperature challenges, are expected to be beneficial for NBTI/PBTI as well.

Advantageously, one or more embodiments provide a reliable method to reduce NBTI/PBTI in manufactured ICs. Furthermore, one or more embodiments advantageously provide a method specifically tailored to reduce NBTI/PBTI, thereby causing accelerated recovery in ICs.

Figure 1:
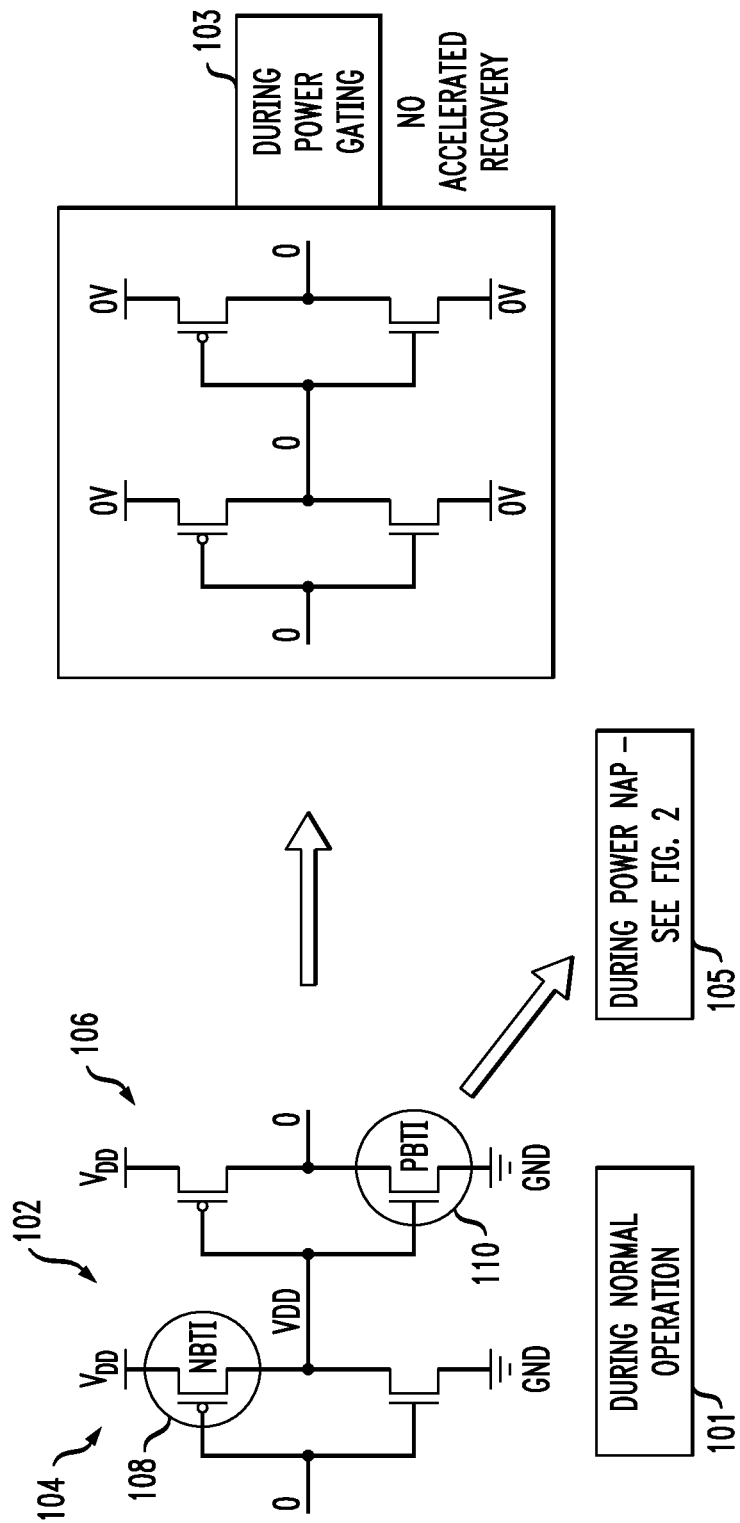
FIG. 1 shows an exemplary circuit during normal operation and during power gating.

FIG. 1 shows a portion 102 of an inverter chain circuit including a plurality of inverter stages 104, 106 with the output of one stage connected to the input of the next. Alternating stages have 0 and VDD at the input. Normal operation is shown at 101. The VDD rail represents high voltage, typically 0.6-1.5 volts (but not limited to this range) in sub-100 nm technologies, whereas the GND rail represents low voltage, typically 0 volts. As seen at 108, in stages with 0 at the input, the PFET is in the ON condition and experiences NBTI. As seen at 110, in stages with VDD at the input, the NFET is in the ON condition and experiences PBTI.

Power gating is shown at 103; the same is used to reduce the power dissipation in the portions of the circuits which are not being used. To accomplish this, either a circuit is cut-off from the VDD rail or it is cut-off from the GND rail, so as to have all the inputs and outputs at the same voltage. Reference character 103 shows the case where the circuit is cut-off from the VDD rail. In this case, while power is not being consumed, all the FETs are in the OFF condition, thereby causing recovery from the BTI-induced stress. However, this recovery is slow and not an accelerated recovery.

Figure 2:
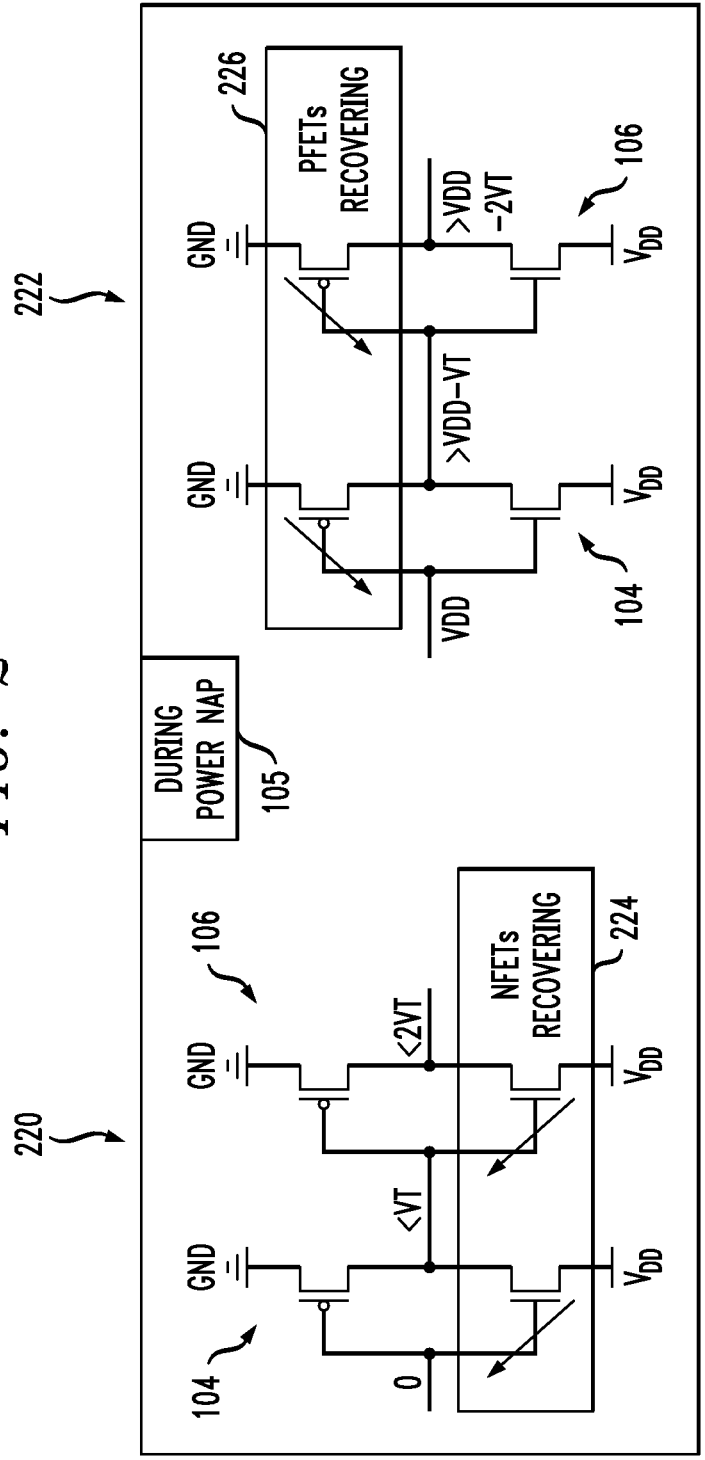
FIG. 2 shows the circuit of FIG. 1 during power napping, in accordance with an aspect of the invention.

Conditions under power napping to cause accelerated recovery are shown at 105 in FIG. 2. The VDD and GND terminals are swapped with respect to 101. View 220 shows a state where the primary input (i.e., that of first inverter 104) has 0 V applied. The output of the first inverter 104 will be at a voltage less than the threshold voltage (VT) of the PFET, and the output of the second inverter 106 will be at a voltage less than twice the threshold voltage (VT) of the PFET. This internal node voltage will gradually (over a period of time) reduce to 0 volts. As seen at 224, under such conditions, the NFETs will see accelerated recovery because of negative voltage between the gate and source terminals. PFETs will see normal recovery as during power-gating. View 222 shows a state where the primary input (i.e., that of first inverter 104) has been toggled to VDD. The output of the first inverter 104 will be at a voltage greater than VDD minus the threshold voltage (VT) of the NFET, and the output of the second inverter 106 will be at a voltage greater than VDD minus twice the threshold voltage (VT) of the NFET. This internal node voltage will gradually (over a period of time) settle to VDD. As seen at 226, under such conditions, the PFETs will see accelerated recovery because of positive gate to source voltage. NFETs will see normal recovery as during power-gating. Hence, during power napping, the primary inputs are toggled between 0 volts and VDD at low frequency to cause accelerated recovery in both NFETs and PFETs. To further accelerate the recovery, VDD during power-napping can be raised above the normal operating voltage.

Figure 3:
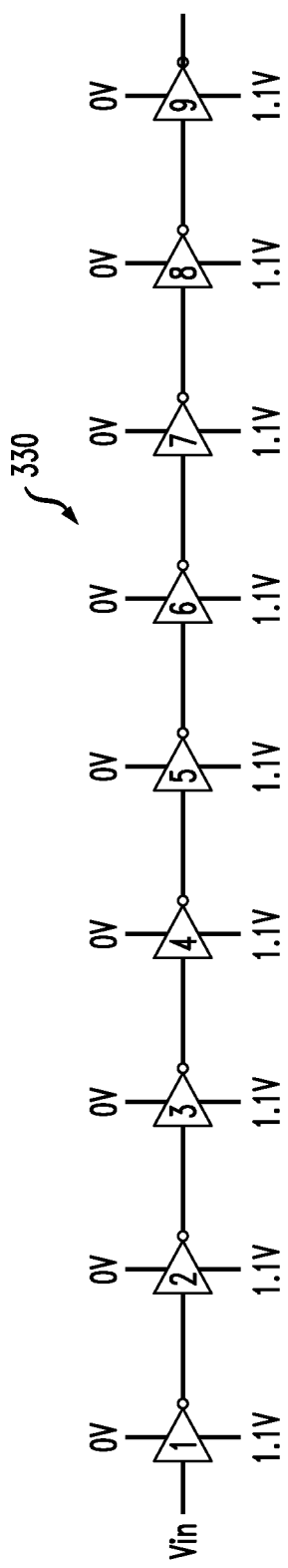
FIG. 3 shows signal propagation through an inverter chain during power napping.
Figure 3:
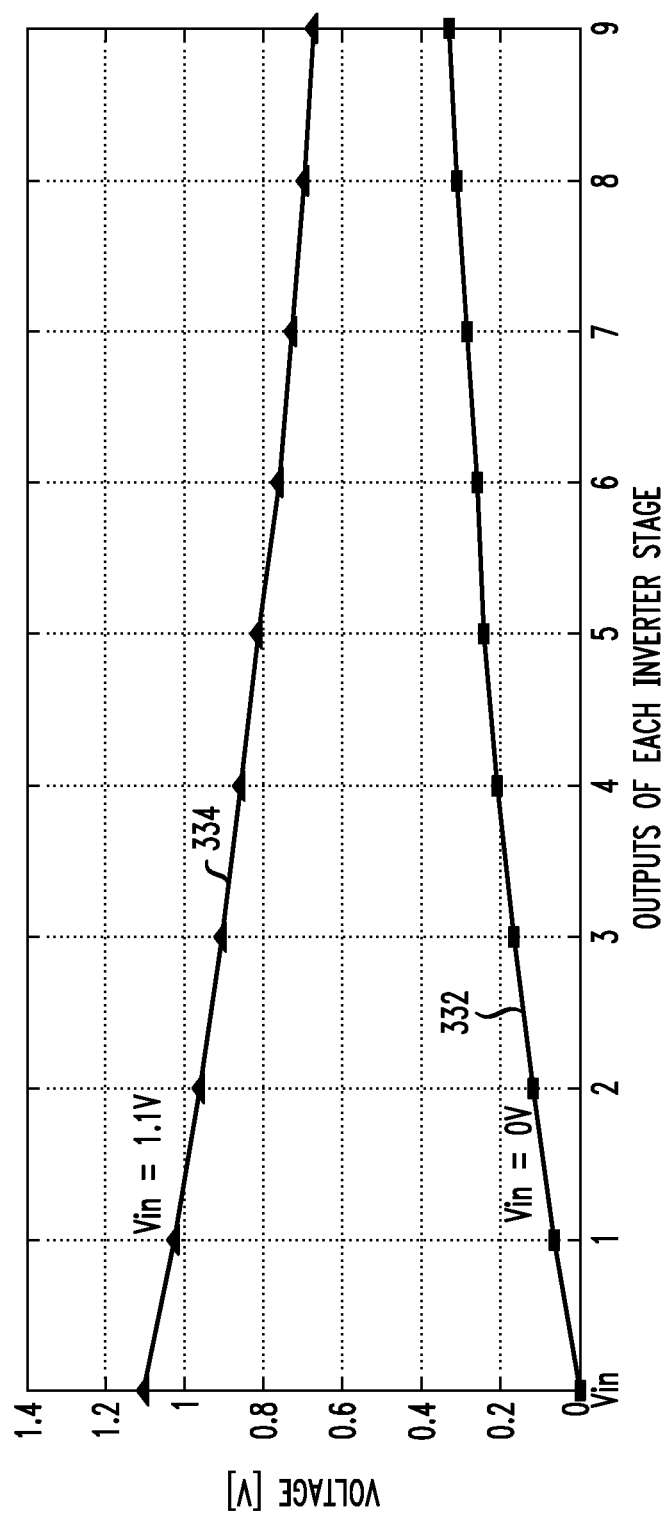

FIG. 3 shows signal propagation through an inverter chain 330 during the power napping condition in FIG. 2 with VDD=1.1 V. Curve 332 shows the voltage, V, at the output of each stage for Vin=0. Curve 334 shows the voltage, V, at the output of each stage for Vin=1.1. As the input voltage to the deeper stages increases above 0V or decreases below 1.1V, these stages see less recovery than the initial stages. However, the recovery in the deeper stages can be increased by increasing the supply voltage during power-napping.

Figure 4:
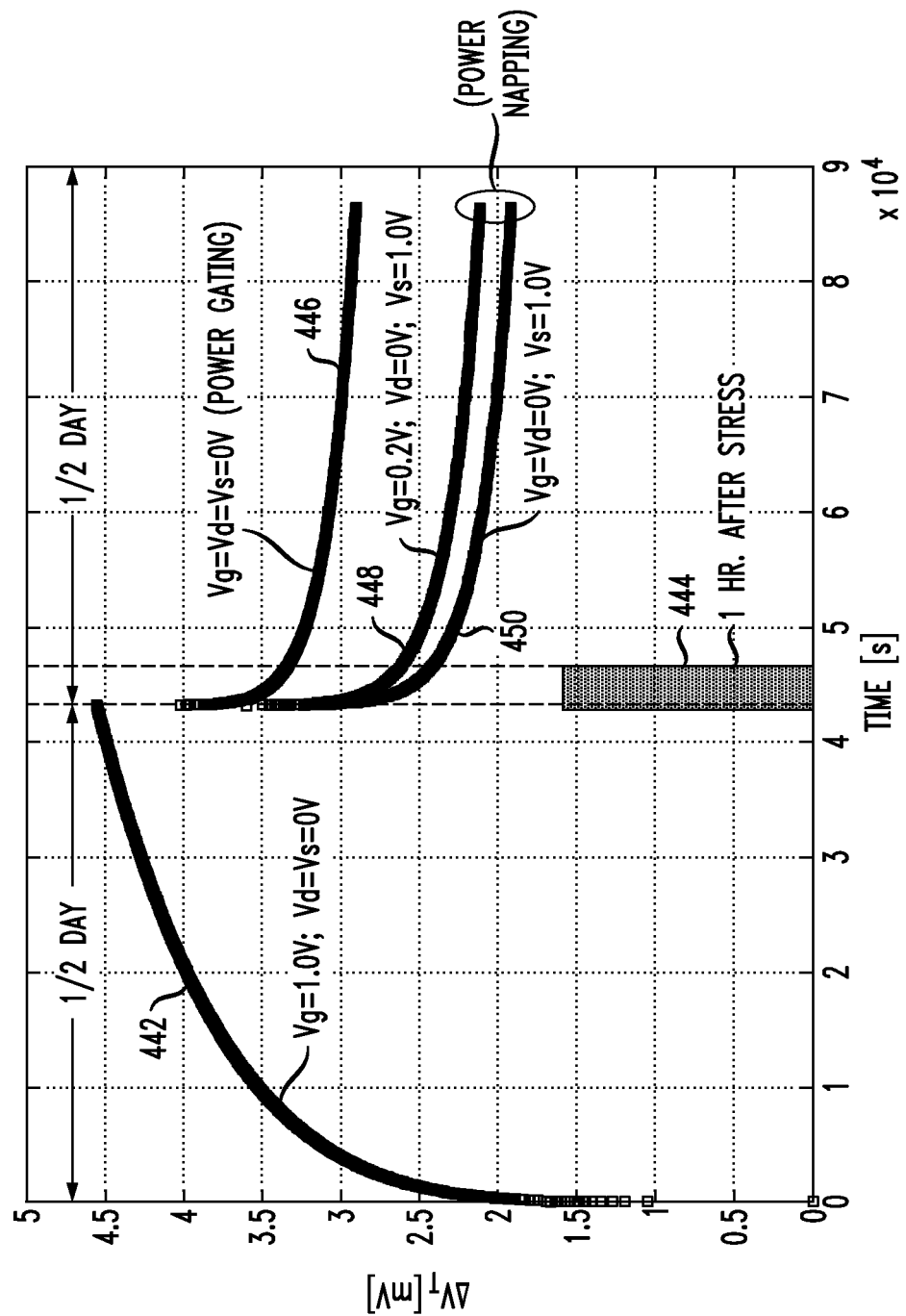
FIG. 4 shows how recovery changes with voltage.
Figure 4:
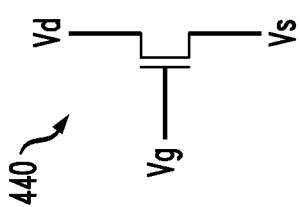

FIG. 4 shows how recovery changes with voltage for power-gating vs. proposed power-napping cases. The voltages are defined at 440, and include drain voltage Vd, gate voltage Vg, and source voltage Vs for the NFET depicted. The example is for a model of advanced silicon-on-insulator (SOI) technology (similar results are expected for NBTI on a corresponding PFET) Curve 442 shows the increase in threshold voltage during a stress condition for half day with Vg=1.0 V, and Vd=Vs=0 V. Curve 446 shows recovery under power gating for half day with all voltages equal to zero. During power-gating some threshold-voltage shift is recovered, however, a non-recoverable threshold voltage change of approximately 3 mV is noted. Curve 448 shows recovery under power napping for half day with Vg=-0.2 V, Vd=0V, and Vs=1.0 V. Note that Vg=0.2 volts does not represent the initial stages of the inverter chain. It represents input to the stage 5 in FIG. 3 by seeing the curve 332. Initial stage NFETs will see lower gate voltage and see more recovery. Going back to curve 448, a non-recoverable threshold voltage change of approximately 2+ mV is noted. Curve 450 shows recovery under power napping with Vg=0.0 V, Vd=0 V, and Vs=1.0 V. A non-recoverable threshold voltage change of approximately 2− mV is noted. Thus, the non-recoverable threshold voltage change is significantly reduced with power napping, and curve 450 with increased voltage shows faster and more complete recovery. As seen at 444, much of the recovery occurs in the first hour after the stress condition.

Figure 5:
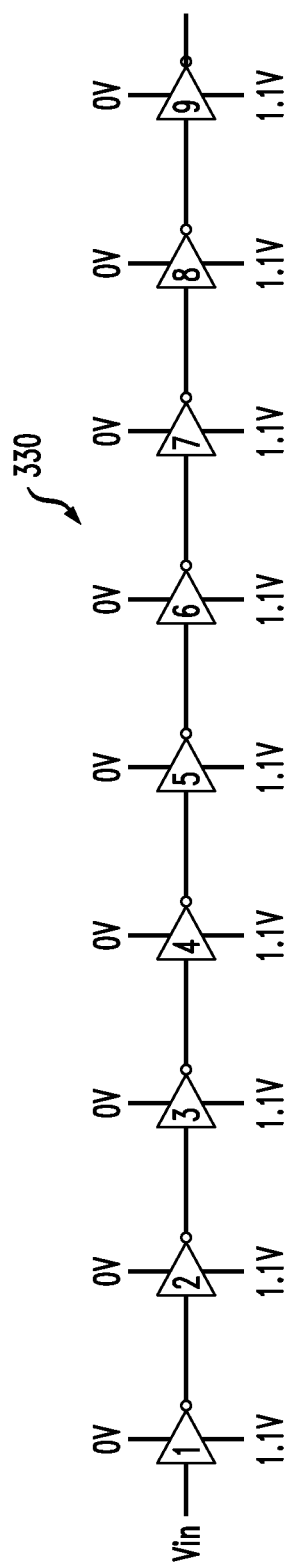
FIG. 5 shows the amount of recovery in the inverter chain from power napping.
Figure 5:
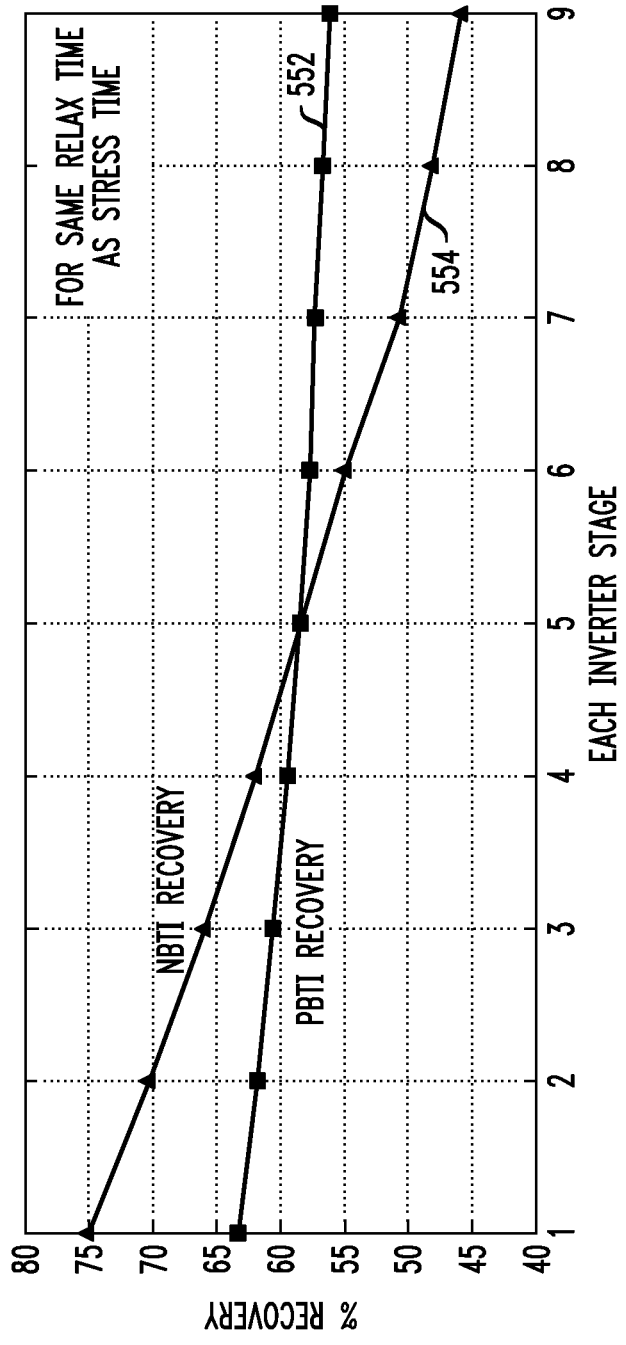

FIG. 5 shows the amount of recovery in the inverter chain 330 during the power napping. Curve 552 shows PBTI recovery and curve 554 shows NBTI recovery for each stage. The same model was employed as in FIG. 4, with the same relax time as stress time. It can be seen that while the deeper stages get less recovery, it is still significant. Again, recovery can be increased by increasing the supply voltage. In power-gated mode, the percentage of NBTI recovery=10% and the percentage of PBTI recovery=37% for each stage.

Figure 6:
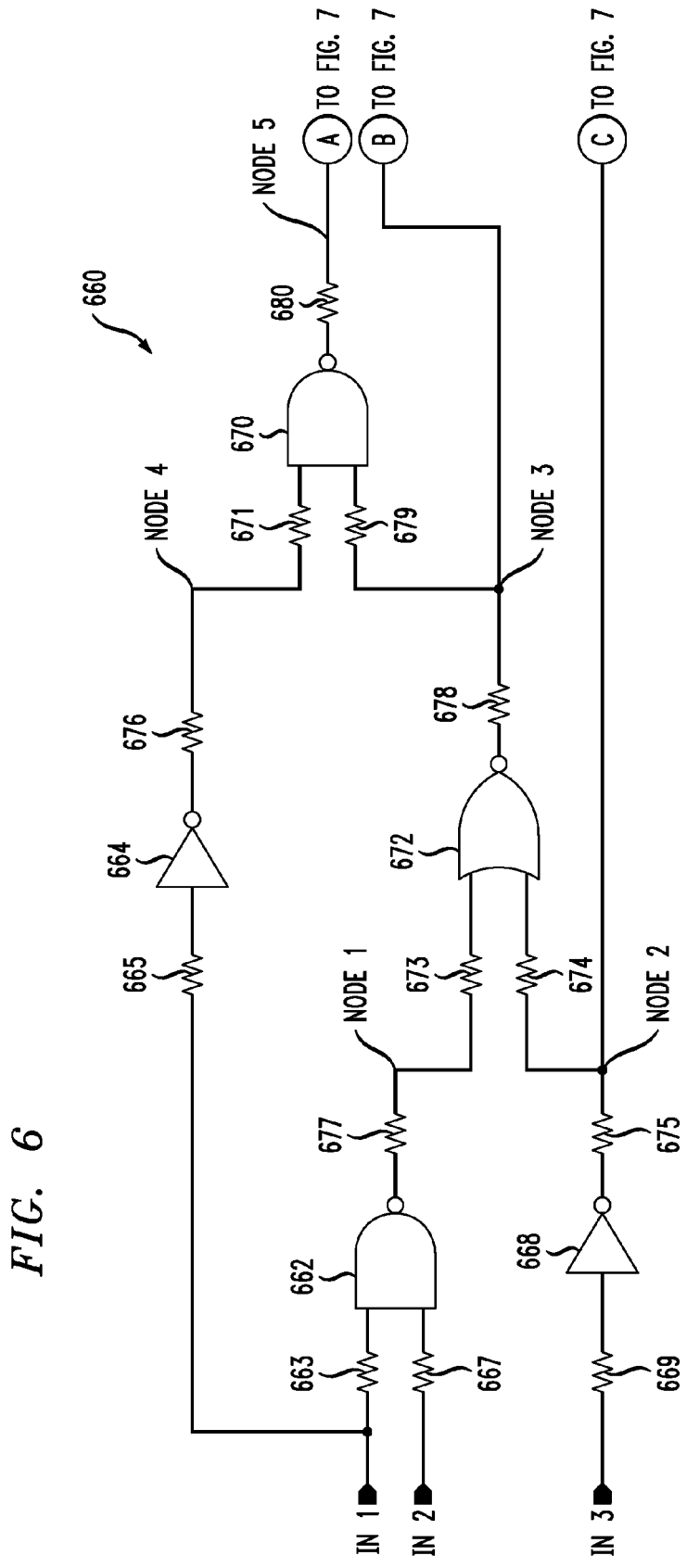
FIGS. 6-8 show signal propagation through a random circuit during power napping.
Figure 7:
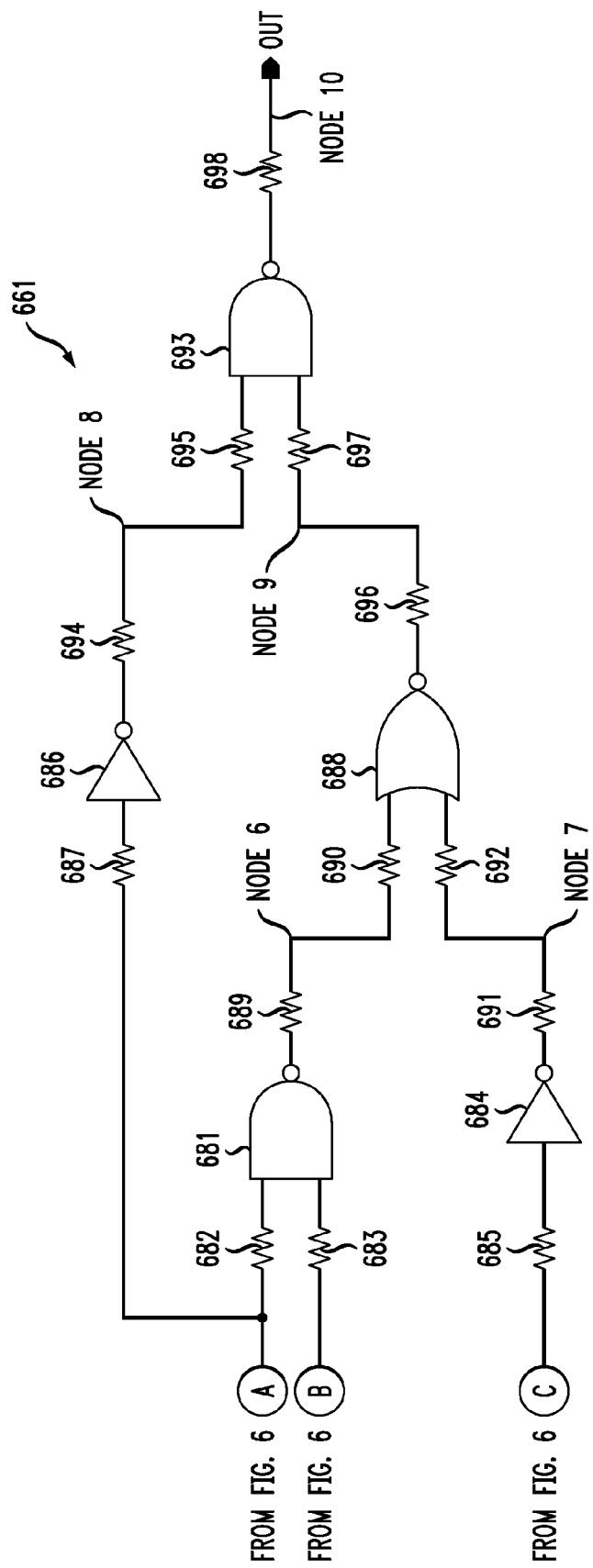
Figure 8:
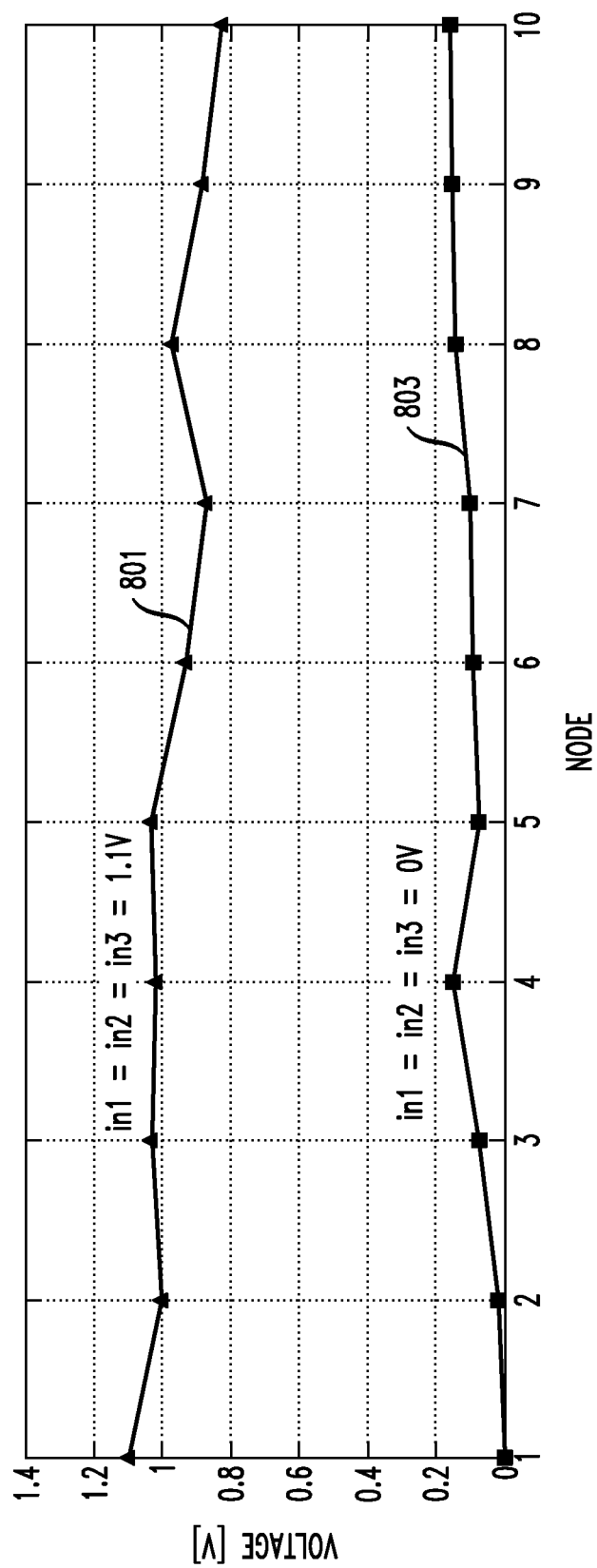

FIGS. 6-8 show signal propagation through a random circuit during power napping. The example of this random circuit demonstrates that power-napping techniques in accordance with one or more embodiments are applicable in any logic circuit and not only to inverter chains. A first portion 660 of the circuit is shown in FIG. 6 and a second portion 661 of the circuit is shown in FIG. 7. A first input is coupled to first input of NAND gate 662 through resistor 663. It is also coupled to the input of inverter 664 through resistor 665. A second input is coupled to the second input of NAND gate 662 through resistor 667. A third input is coupled to the input of inverter 668 through resistor 669.

The output of inverter 664 is coupled to resistor 676 and thence to first input of NAND gate 670 through resistor 671. The output of NAND gate 662 is coupled to resistor 677 and thence to first input of NOR gate 672 through resistor 673. The output of inverter 668 is coupled to resistor 675 and thence to second input of NOR gate 672 through resistor 674, and thence also to point C. The output of NOR gate 672 is coupled to resistor 678 and thence to second input of NAND gate 670 through resistor 679, and thence also to point B. The output of NAND gate 670 is coupled to point A through resistor 680.

Turning now to FIG. 7, points A and B are coupled, respectively to first and second inputs of NAND gate 681 through resistors 682 and 683. Point A is also coupled to the input of inverter 686 through resistor 687. Point C is coupled to the input of inverter 684 through resistor 685. The output of NAND gate 681 is coupled to first input of NOR gate 688 through resistors 689, 690. The output of inverter 684 is coupled to second input of NOR gate 688 through resistors 691, 692. The output of inverter 686 is coupled to first input of NAND gate 693 through resistors 694, 695. The output of NOR gate 688 is coupled to second input of NAND gate 693 through resistors 696, 697. The output of NAND gate 693 is coupled to the circuit output node through resistor 698.

FIG. 8 plots the voltage, V, at the corresponding nodes 1-10 for primary inputs (in1, in2 and in3 in FIG. 6) at 1.1 V (curve 801) and all primary inputs (in1, in2 and in3 in FIG. 6) at 0 V (curve 803). The goal of these curves is to show how signal propagates through a random logic circuit during power-napping. Curve 803 shows that input voltage at the deeper stages is not significantly higher than 0 volts causing significant accelerated recovery in deeper NFETs as well. Curve 801 shows that input voltage at the deeper stages is not significantly lower than VDD thereby causing significant accelerated recovery in deeper PFETs as well.

One or more embodiments provide a novel power-napping technique to cause accelerated recovery in degraded PMOS and NMOS transistors. During normal operation, when a circuit, core, or chip gets "tired" (implying performance degradation due to NBTI and PBTI), it can be put in power-napping mode to accelerate the recovery. "Tiredness" can be determined by an on-chip NBTI/PBTI monitoring circuit and/or can be pre-determined based on knowledge of the usage environment of the IC. U.S. Pat. No. 7,642,864, "Circuits and Design Structures for Monitoring NBTI Effect and/or PBTI Effect," of Chuang et al, the complete disclosure of which is expressly incorporated herein by reference in its entirety for all purposes, sets forth a non-limiting example of an on-chip monitoring circuit. The skilled artisan will be familiar with various pre-determination techniques based on observation of historical data, models, simulations, and the like. In power-napping mode, first the power supply and ground rails of the "tired" circuit are swapped, followed by toggling the primary inputs at a low frequency. If desired, the VDD can be raised in power-napping mode to further accelerate the recovery.

Figure 9:
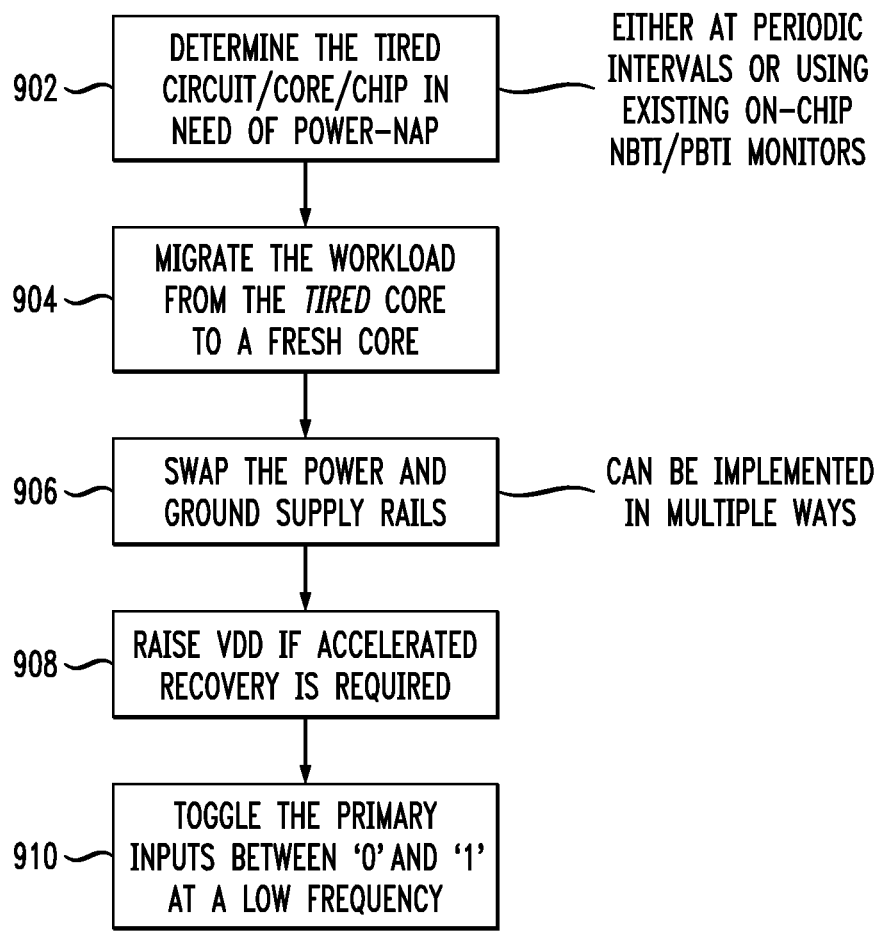
FIG. 9 is a flow chart for an exemplary power napping technique, according to an aspect of the invention.

FIG. 9 is a flow chart depicting an exemplary implementation of a power-napping mode. In step 902, determine which circuit, core, or chip is in need of a power nap; for example, at periodic intervals or using existing on-chip NBTI and/or PBTI monitors. The aforementioned U.S. Pat. No. 7,642,864, "Circuits and Design Structures for Monitoring NBTI Effect and/or PBTI Effect," of Chuang et al, sets forth a non-limiting example of existing on-chip monitors. Periodic monitoring can be carried out by periodically gathering data on circuits actually deployed in the field. In step 904, migrate the workload from the "tired" circuit, core, or chip to a fresh one. In step 906, using one of a variety of suitable techniques, swap the power supply and ground rails. A non-limiting example is provided in FIG. 10, discussed below. Optionally, in step 908, raise VDD if accelerated recovery is desired or required. In step 910, toggle the primary inputs between zero and logical one (i.e., VDD) at low frequency. The low frequency should be sufficiently lower than normal operating frequency so as to not cause any extra power consumption. Typical low frequency values can range from a few milli-Hertz to several mega-Hertz depending upon the normal operating frequency of the operation. In one or more embodiments, the low frequency is no more than 30% of the circuit's normal operating frequency. In some cases, the low frequency is no more than 20% of the circuit's normal operating frequency. The normal operating frequency is a well-known parameter that has a definite meaning to the skilled artisan. For example, early microprocessors ran at frequencies close to 1 MHz, while modern microprocessors run at frequencies exceeding 3 GHz, or 3,000,000,000 Hertz.

Figure 10:
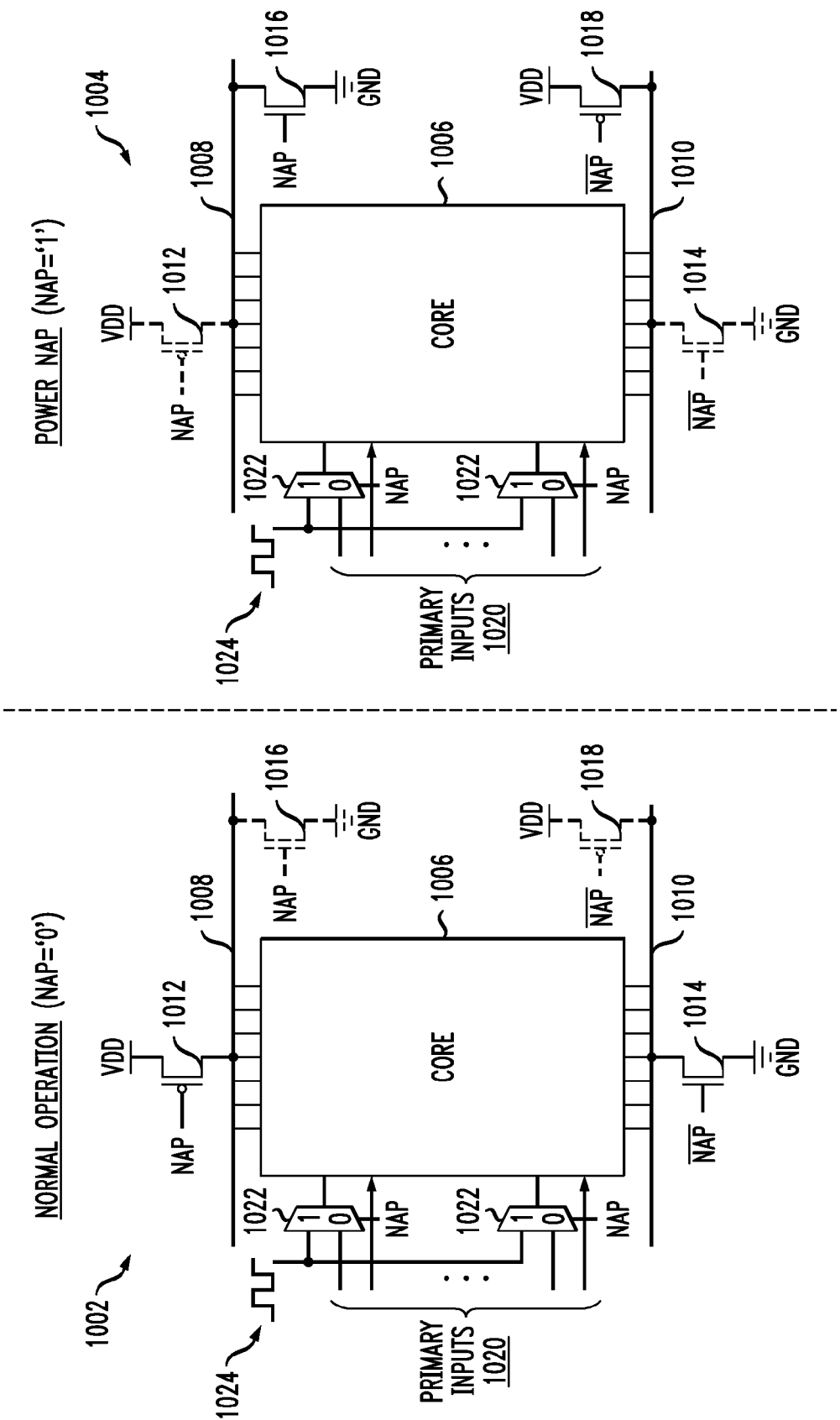
FIG. 10 shows exemplary circuit techniques to implement power supply and ground rail swapping, as well as toggling the primary inputs, during power napping mode, according to an aspect of the invention.

FIG. 10 shows exemplary circuit techniques to implement power supply and ground rail swapping, and toggling of the primary inputs during power-napping mode. In power-napping mode, when the primary inputs are zero, the gate to source-drain voltages of the NMOS transistors are reversed, thereby causing accelerated recovery. There is negligible voltage difference between the gate and source-drain terminals of the PMOS transistors, thereby causing normal recovery. Similarly, in power-napping mode, when the primary input is logic one or high voltage, the PMOS transistors are in accelerated recovery mode whereas the NMOS transistors are in normal recovery mode. Note that in one or more embodiments, the internal node voltages of a circuit are not modified; only the primary inputs are toggled at low frequency. Hence, no additional circuit is required inside the "tired" circuit, thereby causing no performance penalty during normal operation along with no additional design complexity.

The following additional circuits are employed in one or more embodiments to implement power-napping. Other techniques can be employed in other embodiments.

1) A circuit to switch the power supply and ground rails (FIG. 10 shows a non-limiting example)
2) A circuit to toggle the primary inputs (FIG. 10 shows a non-limiting example)
3) A circuit to determine the tiredness level (several other NBTI/PBTI characterization circuits exist; one non-limiting example is set forth in the aforementioned U.S. Pat. 7,642,864, "Circuits and Design Structures for Monitoring NBTI Effect and/or PBTI Effect," of Chuang et al).

As seen in FIG. 10, a core 1006 (also representative of a circuit, chip, etc.) is connected between a first rail 1008, normally VDD, and a second rail 1010, normally ground. In normal operation, view 1002, NAP is logical zero and its complement is logical one. PFET 1012 and NFET 1014 are ON, and PFET 1018 and NFET 1016 are OFF such that rail 1008 is at VDD and rail 1010 is grounded. In power napping operation, view 1004, NAP is logical one and its complement is logical zero. PFET 1012 and NFET 1014 are OFF, and PFET 1018 and NFET 1016 are ON such that rail 1008 is grounded and rail 1010 is at VDD. Core 1006 has a plurality of primary inputs 1020. In normal operation 1002, NAP is logical zero and acts as a select signal to cause multiplexers 1022 to connect the primary inputs 1020 to the corresponding inputs on the core. In power-napping operation 1004, 'nap' is logical one and acts as a select signal to cause multiplexers 1022 to connect the square wave 1024 to the corresponding inputs on the core.

Advantageously, in one or more embodiments, no FETs are stressed during recovery (or power napping mode) (whereas alternate FETs are stressed in some prior art approaches). Furthermore, in one or more embodiments, alternate stages are not connected to separate power and ground rails, but rather the nominally designed circuit is used with all the stages connected to the same power and ground rails (less wiring complexity as compared to the prior art). In one or more embodiments, the voltages on the power and ground rails are swapped during power-napping mode. Advantageously, one or more embodiments can be implemented for any arbitrary logic circuit and are not limited to memory arrays or circuits having "even" and "odd" stages.

One or more embodiments significantly reduce the impact of NBTI and PBTI, provide less stress on the technology to mitigate NBTI and PBTI in FETs, and/or enable a reduced guard-band on ICs, thereby improving yield.

One or more embodiments reduce the threshold-voltages of (i.e., recover degradation of) P-channel and N-channel transistors which have degraded due to NBTI and PBTI, respectively. One or more embodiments do not include forced NBTI and PBTI to combat manufacturing variations.

One or more embodiments recover the victim transistors instead of developing another circuit to cancel out the effect of BTI.

Given the discussion thus far, it will be appreciated that, in general terms, an exemplary method, according to an aspect of the invention, includes operating a logic circuit in a normal mode, as seen at 101 in FIGS. 1 and 1002 in FIG. 10, with a supply voltage VDD coupled to a supply rail (e.g., 1008) of the logic circuit, and with a ground rail (e.g., 1010) of the logic circuit grounded. Another step (e.g., 902 in FIG. 9)

includes determining that at least a portion of the logic circuit has experienced degradation due to bias temperature instability. A still further step, as seen in FIG. 2, at 1004 in FIG. 10, and in step 906 in FIG. 9, includes, responsive to the determining, operating the logic circuit in a power napping mode, with the supply voltage coupled to the ground rail 1010 of the circuit, with the supply rail 1008 of the circuit grounded, and with primary inputs 1020 of the circuit toggled between logical zero and logical one at low frequency, as at 910 in FIG. 9.

As in step 908 in FIG. 9, an optional step includes raising the supply voltage during the power napping mode.

The determining step 902 can be carried out, for example, periodically, and/or using on-chip monitoring circuitry.

As in step 904 in FIG. 9, an optional step includes, responsive to the determining, migrating a workload from the logic circuit to an alternative circuit during the power napping.

In general, the logic circuit and the alternative circuit can be separate portions of a single core on a single integrated circuit chip; separate cores on a single integrated circuit chip; or separate integrated circuit chips.

In one or more embodiments, the operating in the normal mode includes operating at a normal operating frequency; and, in the operating in the power napping mode, the low frequency is sufficiently lower than the normal operating frequency so as to not cause extra power consumption.

In another aspect, a logic circuit for operation with a supply voltage VDD, a ground, and a plurality of primary inputs 1020 includes a circuit portion (e.g., core 1006); a supply rail 1008 of the circuit portion; a ground rail 1010 of the circuit portion; and a switching arrangement (a non-limiting example is discussed elsewhere herein). The switching arrangement is configured to interconnect the supply voltage VDD with the supply rail 1008 of the logic circuit in a normal mode; interconnect the ground with the ground rail 1010 in the normal mode; interconnect the supply voltage VDD with the ground rail 1010 of the logic circuit in a power napping mode; and interconnect the ground with the supply rail 1008 in the power napping mode. See FIG. 10.

In general, input voltages can come from preceding circuits which can be on or off-chip. Power-napping can be selectively applied to different portions of a circuit in a single core of a chip, or a full core on a chip or to a complete chip. In all these cases, the square waveform will typically be generated on-chip, but can also be supplied off-chip.

Figure 13:
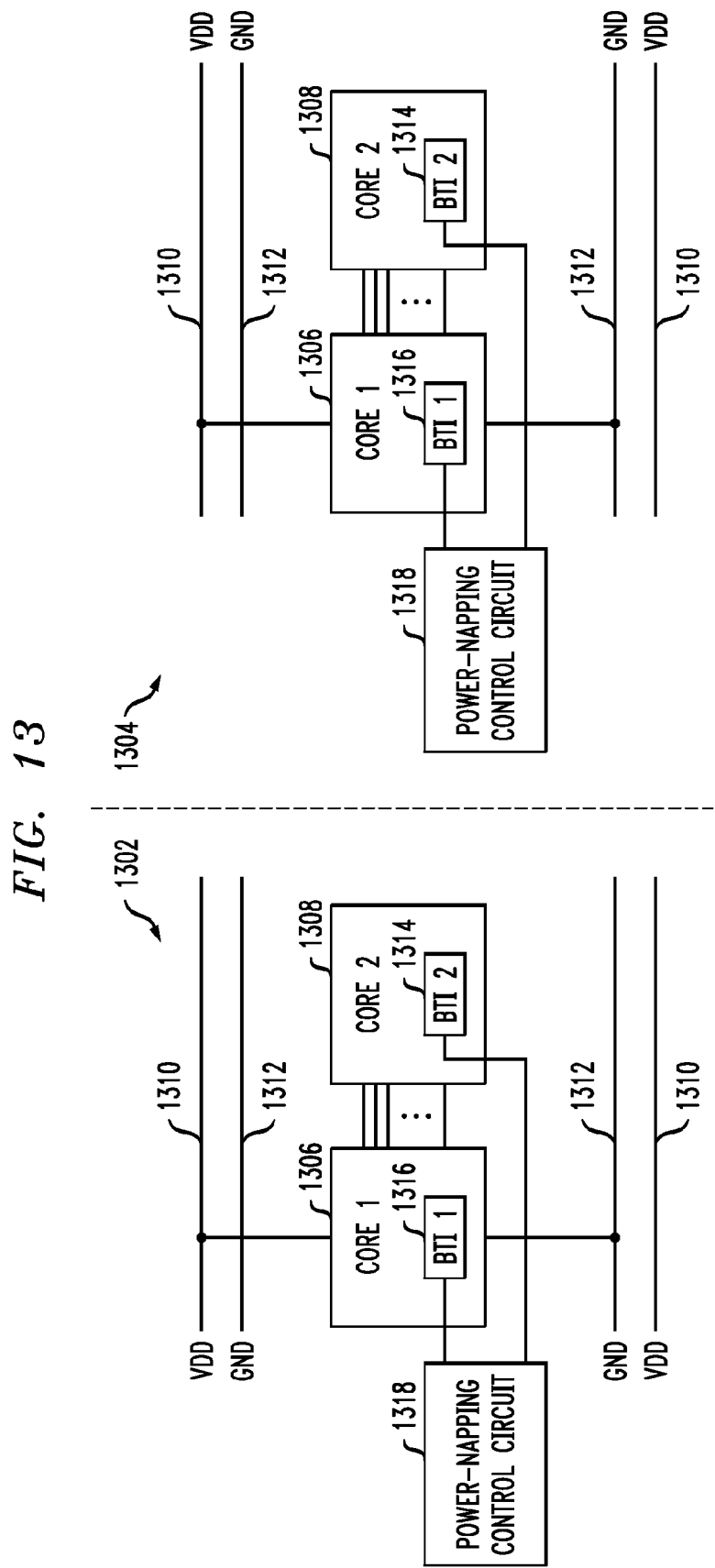
FIG. 13 shows on-chip bias temperature instability monitoring and migration of processing to a stand-by core during power napping, according to an aspect of the invention.

Reference should now be had to FIG. 13. As seen therein, in a first mode 1302, Core 1, designated as 1306, is carrying out a computation, while Core 2, designated as 1308, is either in standby mode (powered ON but not working), power-gating mode, or power-napping mode. Each core may be provided with rails such as 1008, 1010, omitted from FIG. 13 to avoid clutter. Core 1 is connected normally; i.e., a rail analogous to rail 1008 is coupled to VDD 1310 and a rail analogous to rail 1010 is coupled to ground 1312. Since Core 2 might be in a variety of modes, no connections to 1310, 1312 are shown. Each core is provided with on-chip BTI monitoring circuitry 1314, 1316, connected to a power-napping control block such as circuit 1318. BTI 1, designated as 1316, sends a signal to the power-napping control block that Core 1 is near to the aging threshold. The power-napping control block (which can be implemented in hardware (circuit 1318, as shown in the figure) or software) locates Core 2 which is not aged and which is available. The power-napping control block migrates computation to Core 2 and puts Core 1 in power-napping mode, as seen in mode 1304. In mode 1304, Core 1 is power-napping and core 2 is carrying out the computation migrated from Core 1. For example, with regard to Core 1, a rail analogous to rail 1008 is coupled to ground 1312 and a rail analogous to rail 1010 is coupled to VDD 1310. With regard to Core 2, Core 2 is connected normally; i.e., a rail analogous to rail 1008 is coupled to VDD 1310 and a rail analogous to rail 1010 is coupled to ground 1312.

Thus, it will be appreciated that in some cases, the logic circuit further includes on-chip monitoring circuitry 1314, 1316 configured to determine whether the circuit portion requires power napping due to bias temperature instability. Furthermore, in some cases, the logic circuit further includes an alternative circuit portion 1308. The switching arrangement is further configured to migrate a workload from the circuit portion 1306 to the alternative circuit portion 1308 during the power napping. While FIG. 13 shows both features, some embodiments can have an alternative circuit portion without on-chip monitoring and some embodiments could have on-chip monitoring without an alternative circuit portion.

Again, the circuit portion and the alternative circuit portion can be separate portions of a single core on a single integrated circuit chip; separate cores on a single integrated circuit chip; or separate integrated circuit chips.

Some embodiments include a plurality of input terminals, and in such cases, the switching arrangement is further configured to interconnect the primary inputs 1020 with the plurality of input terminals in the normal mode 1002; and interconnect a low frequency square wave source 1024 with the plurality of input terminals in the power napping mode 1004.

In some cases, the logic circuit further includes the low frequency square wave source 1024; in other cases, the low frequency square wave source is external to the logic circuit.

In one non-limiting example, the switching arrangement includes a field effect transistor 1012 of a first type interposed between the voltage supply and the supply rail; a field effect transistor 1014 of a second type interposed between the ground and the ground rail; a field effect transistor 1018 of the first type interposed between the voltage supply and the ground rail; a field effect transistor 1016 of the second type interposed between the ground and the supply rail; and a multiplexer arrangement 1022. The multiplexer arrangement is configured to interconnect the primary inputs with the plurality of input terminals in the normal mode 1002; and to interconnect a low frequency square wave source 1024 with the plurality of input terminals in the power napping mode 1004.

One or more exemplary methods as described herein can be used in the fabrication, testing, or operation of integrated circuit chips. The integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from low-end applications to advanced computer products having a display, a keyboard or other input device, and a central processor. Note that one or more embodiments are particularly useful where adequate life of circuitry is important and thus one or more embodiments may be particularly useful in connection with higher-end applications.

Figure 12:
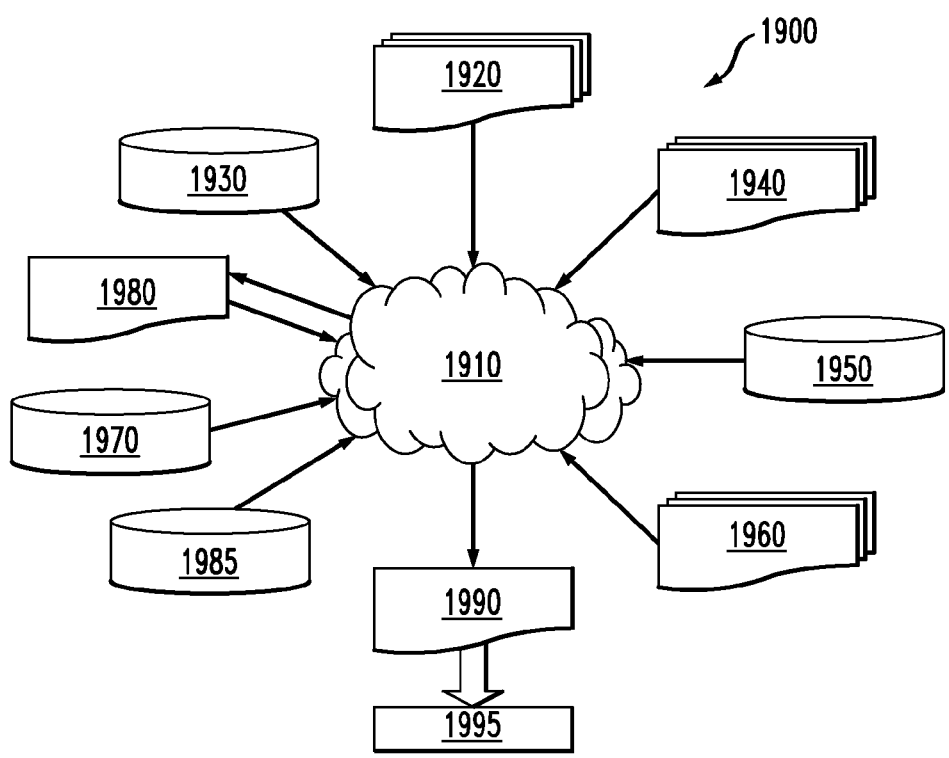
FIG. 12 is a flow diagram of a design process used in semiconductor design, manufacture, and/or test.

FIG. 12 shows a block diagram of an exemplary design flow 1900 used for example, in semiconductor IC logic design, simulation, test, layout, and manufacture. Design flow 1900 includes processes, machines and/or mechanisms for processing design structures or devices to generate logically or otherwise functionally equivalent representations of the design structures and/or devices described above and shown in FIGS. 2, 3, 5-7, 10, and 13. The design structures processed and/or generated by design flow 1900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1900 may vary depending on the type of representation being designed. For example, a design flow 1900 for building an application specific IC (ASIC) may differ from a design flow 1900 for designing a standard component or from a design flow 1900 for instantiating the design into a programmable array, for example a programmable gate array (PGA) or a field programmable gate array (FPGA) offered by Altera® Inc. or Xilinx® Inc.

FIG. 12 illustrates multiple such design structures including an input design structure 1920 that is preferably processed by a design process 1910. Design structure 1920 may be a logical simulation design structure generated and processed by design process 1910 to produce a logically equivalent functional representation of a hardware device. Design structure 1920 may also or alternatively comprise data and/or program instructions that when processed by design process 1910, generate a functional representation of the physical structure of a hardware device. Whether representing functional and/or structural design features, design structure 1920 may be generated using electronic computer-aided design (ECAD) such as implemented by a core developer/designer. When encoded on a machine-readable data transmission, gate array, or storage medium, design structure 1920 may be accessed and processed by one or more hardware and/or software modules within design process 1910 to simulate or otherwise functionally represent an electronic component, circuit, electronic or logic module, apparatus, device, or system such as those shown in FIGS. 2, 3, 5-7, 10, and 13. As such, design structure 1920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1910 preferably employs and incorporates hardware and/or software modules for synthesizing, translating, or otherwise processing a design/simulation functional equivalent of the components, circuits, devices, or logic structures shown in FIGS. 2, 3, 5-7, 10, and 13 to generate a Netlist 1980 which may contain design structures such as design structure 1920. Netlist 1980 may comprise, for example, compiled or otherwise processed data structures representing a list of wires, discrete components, logic gates, control circuits, I/O devices, models, etc. that describes the connections to other elements and circuits in an integrated circuit design. Netlist 1980 may be synthesized using an iterative process in which netlist 1980 is resynthesized one or more times depending on design specifications and parameters for the device. As with other design structure types described herein, netlist 1980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 1910 may include hardware and software modules for processing a variety of input data structure types including Netlist 1980. Such data structure types may reside, for example, within library elements 1930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1940, characterization data 1950, verification data 1960, design rules 1970, and test data files 1985 which may include input test patterns, output test results, and other testing information. Design process 1910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1910 without deviating from the scope and spirit of the invention. Design process 1910 may also include modules for performing standard circuit design processes such as timing analysis, verification, design rule checking, place and route operations, etc.

Design process 1910 employs and incorporates logic and physical design tools such as HDL compilers and simulation model build tools to process design structure 1920 together with some or all of the depicted supporting data structures along with any additional mechanical design or data (if applicable), to generate a second design structure 1990. Design structure 1990 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 1920, design structure 1990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 2, 3, 5-7, 10, and 13. In one embodiment, design structure 1990 may comprise a compiled, executable HDL simulation model that functionally simulates the devices shown in FIGS. 2, 3, 5-7, 10, and 13.

Design structure 1990 may also employ a data format used for the exchange of layout data of integrated circuits and/or symbolic data format (e.g. information stored in a GDSII (GDS2), GL1, OASIS, map files, or any other suitable format for storing such design data structures). Design structure 1990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 2, 3, 5-7, 10, and 13. Design structure 1990 may then proceed to a stage 1995 where, for example, design structure 1990: proceeds to tapeout, is released to manufacturing, is released to a mask house, is sent to another design house, is sent back to the customer, etc.

Exemplary System and Article of Manufacture Details

As will be appreciated by one skilled in the art, some aspects of the present invention and/or portions thereof may be embodied as a system, method or computer program product (for example, software to implement functionality similar to power-napping control circuit 1318; software to conduct simulations to predict circuit tiredness; software to interface with temperature or other sensors for performance monitoring; and/or software to carry out the design process described with regard to FIG. 12). Similarly, some aspects of the present invention and/or portions thereof may take the form of a computer program product embodied in one or more computer readable medium(s) having computer readable program code embodied thereon.

Some aspects of some embodiments of the invention can be implemented in the form of an apparatus including a memory and at least one processor that is coupled to the memory and operative to perform or otherwise facilitate exemplary method steps.

Figure 11:
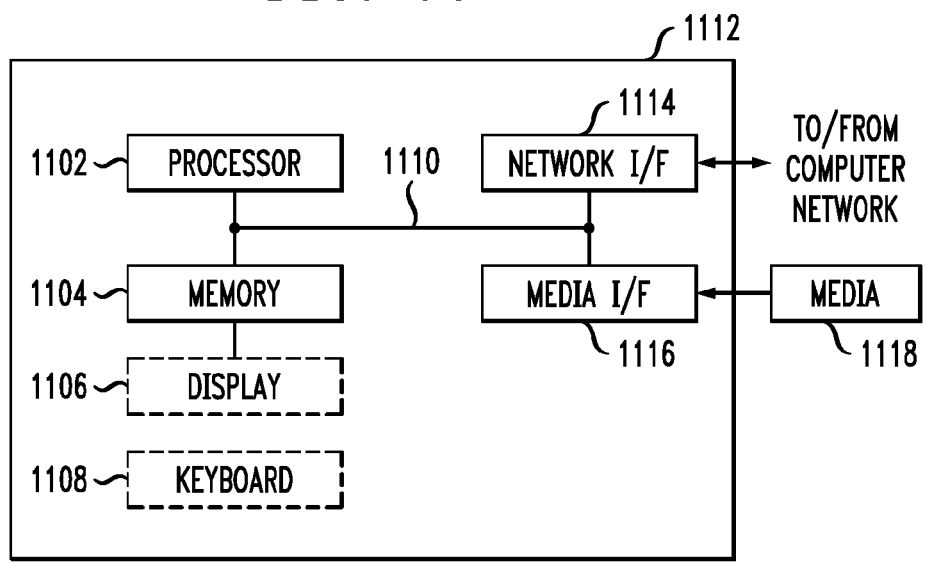
FIG. 11 depicts a computer system that may be useful in implementing one or more aspects and/or elements of the invention.

Some aspects of some embodiments can make use of software running on a general purpose computer or workstation. With reference to FIG. 11, such an implementation might employ, for example, a processor 1102, a memory 1104, and an input/output interface formed, for example, by a display 1106 and a keyboard 1108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1102, memory 1104, and input/output interface such as display 1106 and keyboard 1108 can be interconnected, for example, via bus 1110 as part of a data processing unit 1112. Suitable interconnections, for example via bus 1110, can also be provided to a network interface 1114, such as a network card, which can be provided to interface with a computer network, and to a media interface 1116, such as a diskette or CD-ROM drive, which can be provided to interface with media 1118. In some cases, control signals can be sent over the network or directly and/or temperature or other sensor inputs can be obtained over the network or directly via a sensor interface, analog-to-digital converter, or the like.

Accordingly, computer software including instructions or code for performing the some aspects of some embodiments of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1102 coupled directly or indirectly to memory elements 1104 through a system bus 1110. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1108, displays 1106, pointing devices, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1112 as shown in FIG. 11) running a server program. It will be understood that such a physical server may or may not include a display and keyboard.

As noted, some aspects of some embodiments of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1118 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out some aspects of some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the appropriate software-implementable elements depicted in the figures and/or described herein. Corresponding method steps can then be carried out using the distinct software modules and/or sub-modules of the system executing on one or more hardware processors 1102. Further, a computer program product can include a computer-readable storage medium with code adapted to be implemented to carry out one or more method steps described herein, including the provision of the system with the distinct software modules. For example, software module(s) can implement functionality similar to power-napping control circuit 1318; conduct simulations to predict circuit tiredness; interface with temperature or other sensors for performance monitoring; and/or carry out at least some aspects the design process described with regard to FIG. 12.

In any case, it should be understood that the components illustrated herein may be implemented in various forms of hardware, software, or combinations thereof for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising the steps of:
operating a logic circuit in a normal mode, with a supply voltage coupled to a supply rail of said logic circuit, and with a ground rail of said logic circuit grounded, wherein said logic circuit comprises a plurality of consecutive adjacent stages, each of said consecutive adjacent stages being connected to said supply rail at said supply voltage and said ground rail at ground;
determining that at least a portion of said logic circuit has experienced degradation due to bias temperature instability; and
responsive to said determining, operating said logic circuit in a power napping mode, with said supply voltage coupled to said ground rail of said circuit, with said supply rail of said circuit grounded, and with primary inputs of said circuit toggled between logical zero and logical one at low frequency, such that said plurality of consecutive adjacent stages are connected to said supply rail at ground and said ground rail at said supply voltage and such that n-type field effect transistors of said consecutive adjacent stages recover when said primary inputs are at said logical zero without stressing p-type field effect transistors of said consecutive stages, and such that p-type field effect transistors of said consecutive adjacent stages recover when said primary inputs are at said logical one without stressing n-type field effect transistors of said consecutive stages.

2. The method of claim 1, further comprising raising said supply voltage during said power napping mode.

3. The method of claim 1, wherein said determining is carried out periodically.

4. The method of claim 1, wherein said determining is carried out using on-chip monitoring circuitry.

5. The method of claim 1, further comprising, responsive to said determining, migrating a workload from said logic circuit to an alternative circuit during said power napping.

6. The method of claim 5, wherein, in said migrating step, said logic circuit and said alternative circuit comprise separate portions of a single core on a single integrated circuit chip.

7. The method of claim 5, wherein, in said migrating step, said logic circuit and said alternative circuit comprise separate cores on a single integrated circuit chip.

8. The method of claim 5, wherein, in said migrating step, said logic circuit and said alternative circuit comprise separate integrated circuit chips.

9. The method of claim 1, wherein:
said operating in said normal mode comprises operating at a normal operating frequency; and
in said operating in said power napping mode, said low frequency is sufficiently lower than said normal operating frequency so as to not cause extra power consumption.

10. A logic circuit for operation with a supply voltage, a ground, and a plurality of primary inputs, said logic circuit comprising:
a plurality of input terminals;
a circuit portion comprising a plurality of consecutive adjacent stages each having at least one n- type field effect transistor and at least one p-type field effect transistor;
a supply rail of said circuit portion;
a ground rail of said circuit portion, each of said consecutive adjacent stages being connected to said supply rail and said ground rail;
a switching arrangement configured to:
interconnect the supply voltage with said supply rail of said logic circuit in a normal mode;
interconnect the ground with said ground rail in said normal mode;
interconnect the supply voltage with said ground rail of said logic circuit in a power napping mode;
interconnect the ground with said supply rail in said power napping mode;
interconnect the primary inputs with said plurality of input terminals in said normal mode; and
interconnect a low frequency square wave source, providing a logical zero and a logical one, with said plurality of input terminals in said power napping mode such that said n-type field effect transistors of said consecutive adjacent stages recover when said primary inputs are at said logical zero without stressing said p-type field effect transistors of said consecutive stages, and such that said p-type field effect transistors of said consecutive adjacent stages recover when said primary inputs are at said logical one without stressing said n-type field effect transistors of said consecutive stages;
and on-chip monitoring circuitry configured to determine whether said circuit portion requires power napping due to bias temperature instability.

11. The logic circuit of claim 10, further comprising an alternative circuit portion, wherein said switching arrangement is further configured to migrate a workload from said circuit portion to said alternative circuit portion during said power napping.

12. The logic circuit of claim 11, wherein said circuit portion and said alternative circuit portion comprise separate portions of a single core on a single integrated circuit chip.

13. The logic circuit of claim 11, wherein said circuit portion and said alternative circuit portion comprise separate cores on a single integrated circuit chip.

14. The logic circuit of claim 11, wherein said circuit portion and said alternative circuit portion comprise separate integrated circuit chips.

15. The logic circuit of claim 10, further comprising said low frequency square wave source.

16. The logic circuit of claim 10, wherein said switching arrangement comprises:
a field effect transistor of a first type interposed between the voltage supply and said supply rail;
a field effect transistor of a second type interposed between the ground and said ground rail;
a field effect transistor of said first type interposed between the voltage supply and said ground rail;
a field effect transistor of said second type interposed between the ground and said supply rail; and
a multiplexer arrangement configured to:
interconnect the primary inputs with said plurality of input terminals in said normal mode; and
interconnect said low frequency square wave source with said plurality of input terminals in said power napping mode.

17. The logic circuit of claim 16, further comprising said low frequency square wave source.

18. A design structure, tangibly embodied in a non-transitory manner in a machine readable medium for designing, manufacturing, or testing an integrated circuit, the design structure comprising:
a logic circuit for operation with a supply voltage, a ground, and a plurality of primary inputs, said logic circuit in turn comprising:

a plurality of input terminals;
a circuit portion comprising a plurality of consecutive adjacent stages each having at least one n-type field effect transistor and at least one p-type field effect transistor;
a supply rail of said circuit portion;
a ground rail of said circuit portion, each of said consecutive adjacent stages being connected to said supply rail and said ground rail; and
a switching arrangement configured to:
  interconnect the supply voltage with said supply rail of said logic circuit in a normal mode;
  interconnect the ground with said ground rail in said normal mode; interconnect the supply voltage with said ground rail of said logic circuit in a power napping mode;
  interconnect the ground with said supply rail in said power napping mode;
  interconnect the primary inputs with said plurality of input terminals in said normal mode; and
  interconnect a low frequency square wave source, providing a logical zero and a logical one, with said plurality of input terminals in said power napping mode such that said n-type field effect transistors of said consecutive adjacent stages recover when said primary inputs are at said logical zero without stressing said p-type field effect transistors of said consecutive stages, and such that said p-type field effect transistors of said consecutive adjacent stages recover when said primary inputs are at said logical one without stressing said n-type field effect transistors of said consecutive stages;
  and on-chip monitoring circuitry configured to determine whether said circuit portion requires power napping due to bias temperature instability.

19. The design structure of claim 18, wherein said logic circuit further comprises an alternative circuit portion, wherein said switching arrangement is further configured to migrate a workload from said circuit portion to said alternative circuit portion during said power napping.

20. The design structure of claim 19, wherein said circuit portion and said alternative circuit portion comprise separate portions of a single core on a single integrated circuit chip.

21. The design structure of claim 19, wherein said circuit portion and said alternative circuit portion comprise separate cores on a single integrated circuit chip.

* * * * *